Figure 1:
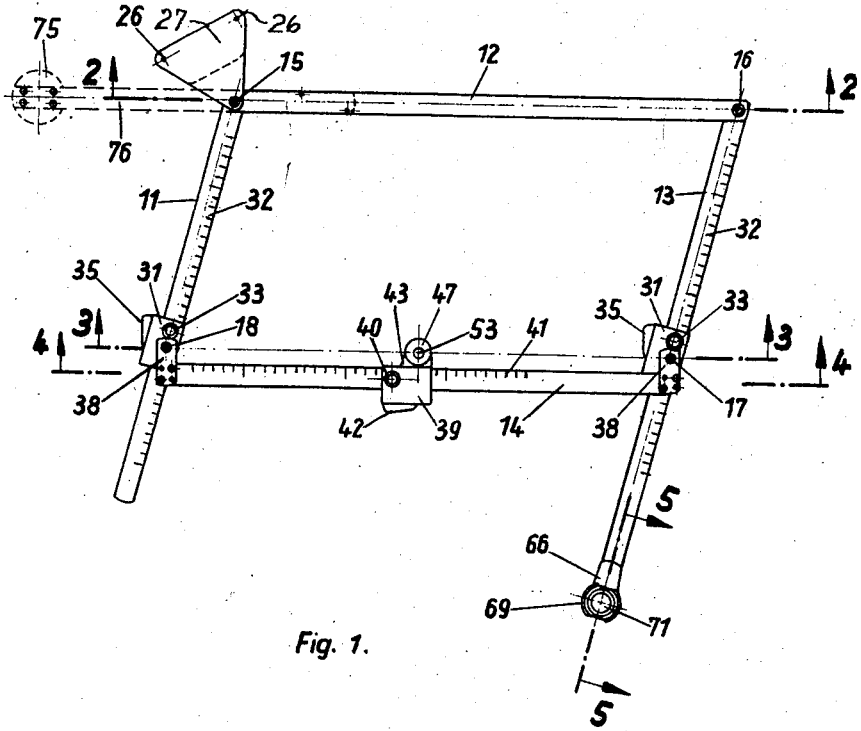

April 6, 1954  H. OTT  2,674,042

PANTOGRAPH

Filed Feb. 28, 1951  3 Sheets-Sheet 1

INVENTOR
HERMANN Ott
By: Young, Emery & Thompson
Atty's.

April 6, 1954  H. OTT  2,674,042
PANTOGRAPH
Filed Feb. 28, 1951  3 Sheets-Sheet 2

INVENTOR
HERMANN Ott
By Young, Emery & Thompson
Attys.

Patented Apr. 6, 1954

2,674,042

UNITED STATES PATENT OFFICE 2,674,042

PANTOGRAPH

Hermann Ott, Kempten, Germany

Application February 28, 1951, Serial No. 213,124

Claims priority, application Germany March 27, 1950

10 Claims. (Cl. 33—25)

This invention relates to a drawing instrument of the type known as pantograph or diagraph, serving for reducing, enlarging or accurately redrawing any drawings, stencils, diagrams, charts, plans, maps, patterns or other pictorial or graphic representations.

It is an object of the present invention to provide a pantograph combining the simplicity and cheapness of the conventional plain pantograph or diagraph with an accuracy nearing that of large size precision pantographs, so as to meet modern requirements in technical use by architects, designers and other draftsmen.

According to the invention bars are used which are linked or jointed together parallelogramfashion, the main points of the system, i. e., the pole, the drawing pencil or stipple graver and the tracing point being mounted thereon, thus making up a system resembling that of a plain pantograph.

According to the present invention these system points are carried in guides mounted on flat bars similar to rulers, the bearing areas thereof for supporting the bar system on the plane of the drawing being arranged in a plane of support lying in, or closely below, the under face of the bar system. Apart from these supporting surfaces provided at the system point guides, further supporting surfaces may be arranged on the rod system in the same plane of support, more particularly at the joints of the flat bars.

Thus it is primarily achieved that the pantograph bars are disposed practically directly on, or at least only a very small distance above, the drawing plane and the system points, i. e., the pole, the drawing pencil or stipple graver, and the tracing point are guided and held in or at least closely over, this drawing plane, so that the vertical position of the joint pins and the pencils points or system points which is decisive for the accuracy of drawing, is absolutely ensured. Thus the sources of errors caused by the elastic resiliency of the bars in the vertical direction and the inclined position of the joints and system points in the known simple pantographs are substantially eliminated and a high accuracy is obtained. Yet the invention permits a simple, cheap, and robust construction of the pantograph which moreover has a low weight, is collapsible to small dimensions and easily portable.

The supporting surfaces of the guides for the system points and other supporting points can coincide with the under faces of the flat bars, but preferably a small distance is left between these supporting surfaces and the bars. To this end, the guides and joint pins or other points of support are provided with flat, advantageously somewhat rounded-off supporting legs, whose supporting surfaces are also flush with the under faces of inserts adapted to be inserted in the guides. Such inserts are used especially in order to be able to put alternatively a sleeve for a pencil or stipple graver or a pole pin or a tracing point into the annular guides. In place of a tracing point preferably a tracing magnifier is used whose under face serving directly as a supporting surface has a tracing point or center circle. The use of such a tracing magnifier is of special advantage in my pantograph because it permits the arrangement of the supporting surface of the tracing point directly or closely under the plane of the bar system without affecting the good visibility of the tracing point and the accurate tracing of the lines or traces.

According to a further feature of the invention the drawing pencil or stippling graver is arranged in such a way that its point always strikes the drawing plane in the supporting surface of its guide if it is in its operative position. To this end the lead mine or the stipple graver is mounted in a sleeve which is axially slidable in the pencil guide or in an insert thereof and slightly lifted by a spring in its position of rest. Preferably a wire-operated release after the type of the photographic shutter release is used for operating the drawing pencil or stipple graver.

The middle bar of the pantograph is slidable on the side bars by means of slidable sleeves, and the actual system point is slidably arranged on the center bar. In order to be able to adjust any desired ratio, these bars are advantageously provided with millimeter graduations or corresponding graduations on which the slides provided with markings are adjustable and adapted to be fixed by means of releasable clamping devices or the like. The joints are made as short as possible and the joints connecting the middle bar with the side bars are mounted on lateral slides. It is advantageous in this case to shift the joints of the middle bar from the longitudinal axis thereof to a position on a short arm laterally projecting from the middle bar. Thus the system point which is slidable on the middle bar can also be arranged laterally on the bar, whereby the respective guide of the system point can easily be arranged so that its point of support is disposed directly or closely under the plane of the bar system.

Finally, the bar system of the pantograph is advantageously counterweighted so that the instrument can also be used on an inclined or upright drawing board.

Other and further objects, features and advantages of the invention will be pointed out hereinafter and appear in the appended claims forming part of the application.

In the accompanying drawings a now preferred embodiment of the invention is shown by way of illustration and not by way of limitation.

Fig. 1 is a top view of a pantograph having the invention applied thereto, in the position "pole at end,"

Figure 2:
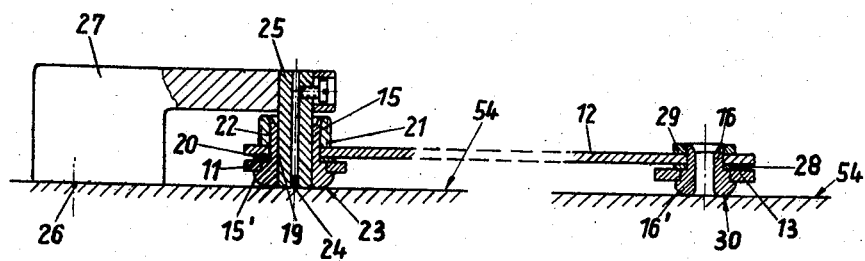
Figure 3:
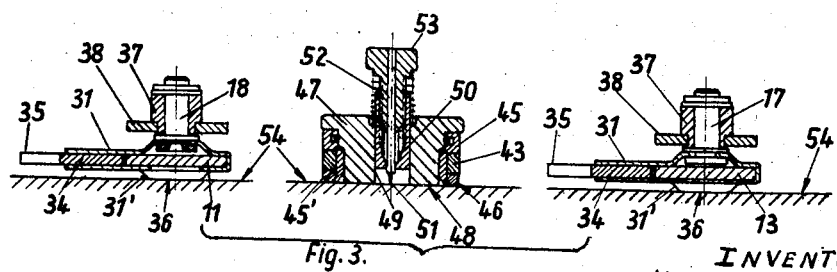
Figure 4:
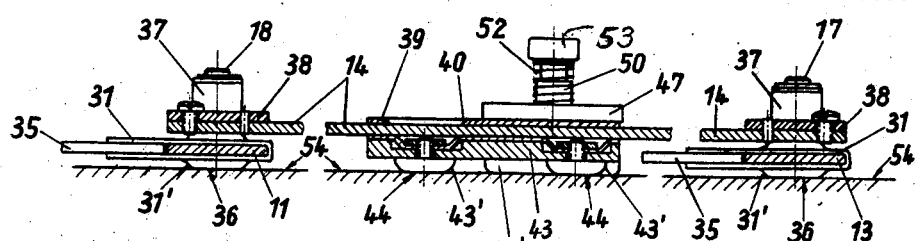
Figures 5, 7:
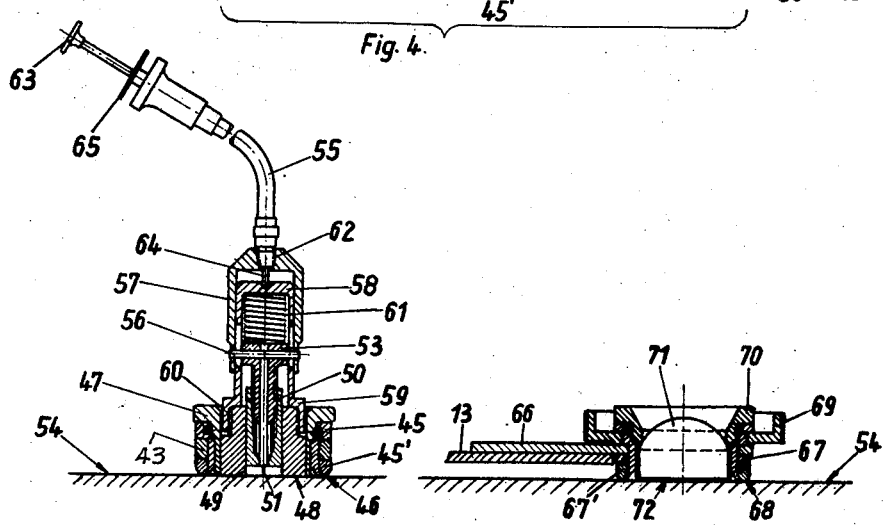
Figures 6, 8:
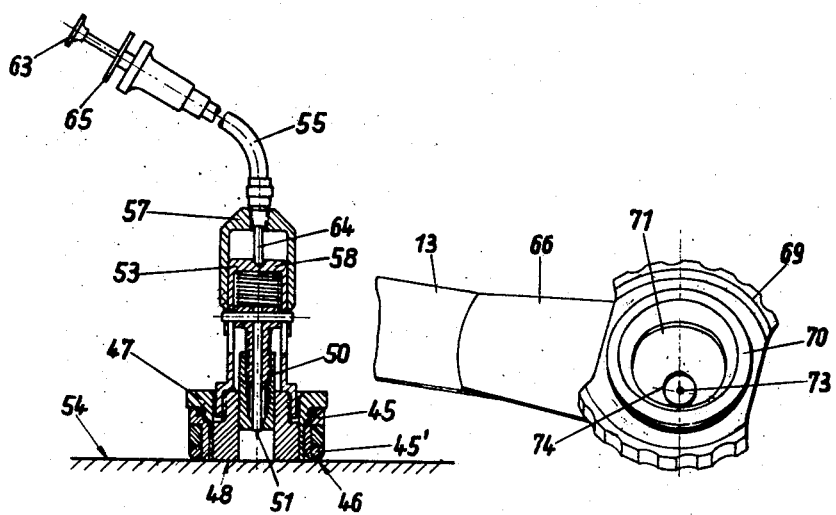
Figure 9:
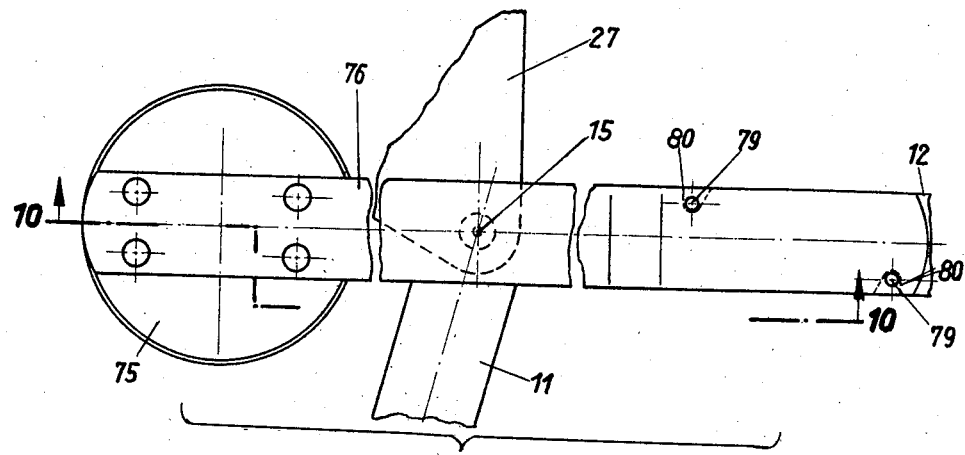
Figure 10:
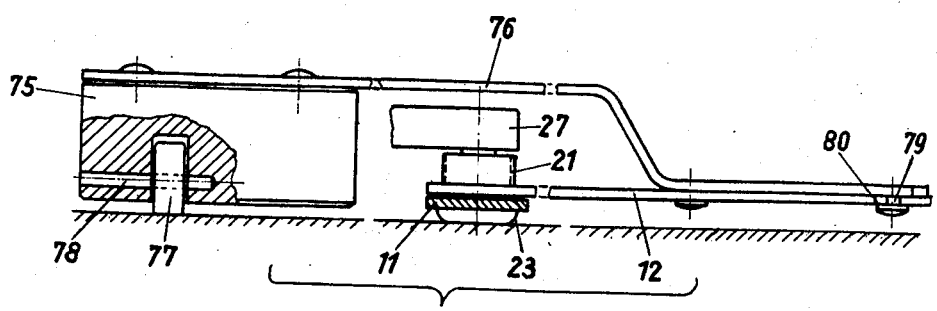

Fig. 2 is a section on a larger scale, on the line 2—2 of Fig. 1, the transverse rod being broken off in the middle, Fig. 3 is a section on line 3—3 of Fig. 1 on a larger scale, the side parts being displaced towards the middle, Fig. 4 is a section on line 4—4 of Fig. 1, also on a large scale, and with the middle bar twice broken off, Fig. 5 is a fragmentary section on line 5—5 of Fig. 1, on a larger scale, with a tracing magnifier being inserted, Fig. 6 is a perspective view of the part shown in Fig. 5 in a sectional view, Fig. 7 is a section similar to the middle part of Fig. 3, showing a device for operation of a drawing pencil or stipple graver by a wire-operated release shown in a lateral view and broken off, with the stipple graver in its operative position, Fig. 8 shows the device of Fig. 7 with the stipple graver lifted into its position of rest, Fig. 9 is a plan view with the bars broken off, showing the arrangement of a counterweight on the pantograph, and Fig. 10 is a section on line 10—10 of Fig. 9, both figures being shown on a larger scale compared to Fig. 1.

Similar reference numerals denote similar parts in the different views.

The pantograph shown in the drawing comprises substantially four flat bars 11, 12, 13, and 14 which are connected together by joint pins 15, 16, 17, and 18, in the form of a parallelogram. The flat bars 11, 12, 13, 14 have a rectangular, flat cross section and consist, e. g., of metal, preferably of light metal, or of any other suitable material.

As shown in Fig. 2, the joint pin 15 is hollow and provided with an axial guide bore 19. Horizontally rotatably mounted on this joint pin 15 are the corresponding ends of the shorter side rod 11 and of the transverse bar 12, being separated merely by a thin separating disc or washer 20 in order to keep the pin as short as possible. The hollow pin is riveted on its top end by a ring 22 having a thread 21. The pin 15 forms a guide for a system point, i. e., in the case illustrated, with the position "pole at end," the pole guide. Its lower supporting surface 23 advantageously formed by an enlarged rounded-off leg 15' is positioned closely beneath the under face of the flat bar 11, in a plane of support 54 coinciding with the drawing plane.

A pole pin 25 provided with a needle point 24 may be rotatably inserted in the guide bore 19 of the hollow pin 15, said pole pin being secured on a corner of a pole weight 27 provided on its under side with further needle points 26. Instead of the pole pin in case of the position "pole in the center" a sleeve for a drawing pencil or stippling pen may be inserted in the guide bore 19.

The jointed ends of the cross bar 12 and of the longer side bar 13 are mounted on the joint pin 16 which advantageously is also hollow, so as to be horizontally rotatable, see right hand side of Fig. 2, with a thin separating washer 28 being interposed. This pin 16 which is made as short as possible is riveted at its top end with a ring 29 and terminates at the bottom side closely beneath the under face of the bar 13 in a supporting surface 30 which advantageously forms the under face of a flat rounded-off leg 16' of the joint pin 16.

The middle bar 14 is jointed to the two side bars 11 and 13 not directly, but by means of slides 31 which are slidably guided on the rulers 11, 13 provided with millimeter graduation, see Figs. 1, 3, and 4. The two substantially equal lateral slides 31 consist of U-shaped sheet members embracing the rulers 11 or 13, which sheet members have perforations 33 provided with markings at their top side, for adjustment of the slides on the graduations 32. By spring-urged clamping members 34 mounted between the free projecting sheet ends and having locking keys 35 projecting outwards the slides 31 can be fixedly clamped on the bars 11 and 13 in any position adjusted.

The slides 31 at the lower sides are advantageously provided with flat rounded legs 31' whose supporting surfaces 36 thus are disposed closely beneath the under faces of the flat bars or rulers 11 or 13, in the supporting plane 54 already mentioned. On the upper side of the slide 31 are secured, e. g. by riveting, the joint pins 17 and 18. Rotatably mounted on the joint pins 17 or 18 are sleeves 37 seated on short flat arms 38 connected at right angles with the end of the middle bar 14.

On the middle bar 14 is slidably guided a middle slide 39 shaped similar to the lateral slide 31, see Fig. 1 and Fig. 4, middle part. The middle slide 39 consisting of a U-shaped bent metal sheet and embracing the bar 14 has at its top a perforation 40 with a mark by which the slide is adjustable in relation to a millimeter graduation 41 of the bar 14. By means of a clamping device not shown in detail, provided with a locking key 42, the middle slide 39 can be tightly clamped on the bar 14 in any position. At its under side the middle slide 39 bears a holding plate 43 projecting laterally towards the inner space of the parallelogram, which plate may be provided with flat legs 43' whose supporting surfaces 44 are disposed closely beneath the horizontal plane defined by the under faces of the side rulers 11, 13. The contact surfaces 44 thus are also disposed in the supporting or drawing plane 54 directly or closely beneath the plane of the bar system.

On the projecting part of the holding plate 43 is fastened an annular system point guide 45 in such a lateral distance from the middle bar 14 that the vertical middle axis of the ring 45 is disposed on the middle or center line 3—3 (Fig. 1) passed through the joint pins 17 and 18. The guide ring 45 has at its lower side a flat rounded base ring 45', whose supporting surface 46 is disposed closely beneath the horizontal plane extending through the under faces of the flat bar 11, 13, in the supporting or drawing plane 54, see Fig. 3.

Into the guide ring 45 for the system point may be clamped an insert 47 whose lower supporting surface 48 lies flush with the supporting plane 46 of the annular base 45', or at least advantageously does not project beyond the same. In a central guide bore 49 of the insert 47 can be inserted for longitudinal sliding a sleeve 50 holding a pencil lead or a pointed dotting needle 51. The sleeve 50 bears by means of a spring 52 on the upper edge of the bore 49 and can be moved into the bore against action of this spring by a slight pressure on the head 53 of the sleeve, so that the pencil lead or the point 51 of the dotting needle will strike on to the drawing plane 54.

According to an advantageous form of the invention, shown in Figs. 7 and 8, the sleeve 50 for the drawing pencil or stippling graver can also be operated by means of a wire release 55. To this end the head 53 of the sleeve is fastened by a transverse pin 56 to a writing head 57 in which is mounted for londitudinal sliding a pressure member 58 whose foot part 59 can be screwed by means of a female thread on a male thread 60 provided in the insert 47. Seated inside the pressure member 58 is a spring 61 which bears on the sleeve head 53.

The wire release 55 can be screwed into the writing head 57 at 62. When the release knob 63 is pressed from its position shown in Fig. 7 into the release tube (Fig. 8), the release pin 64 striking on to the pressure member 58 will advance and lift the writing head 57 and then the sleeve 50 against action of the spring 61 from the position of Fig. 7 upwards into the position shown in Fig. 8 in which the drawing pencil or dotting pen 51 is lifted off from the drawing plane 54. By rotation of the arresting disc 65 the release and so the writing pencil or dotting pen 51 can be retained in this lifted position.

Secured to the free end of the longer side bar 13, e. g., by means of a holding sheet 66, is a further system point guide ring 67 which has the same dimensions, at least inside, as the system point guide ring 45. According to Figs. 5 and 6 the guide ring 67 is provided at its bottom with a flat, rounded foot ring 67', whose supporting surface 68 is disposed directly or closely below the under face of the flat bar 13 in the supporting or drawing plane 54. The top end of the guide ring 67 bears a preferably rotatable tracing head 69 by which the bar system of the pantograph can be manually guided. In the guide ring 67 can be inserted a magnifier holder 70 including a tracing magnifier 71, whose flat under face lies accurately, or approximately, flush with the supporting surface 68 of the foot ring 67'. The under face 72 of the magnifier is provided with a tracing mark serving as a tracing point, e. g. in the form of a point, a point combined with a circle, or a center circle 73 which if desired may be provided on a smaller, thin disc 74 of a transparent, particularly hard material, e. g. synthetic sapphire cemented on the under face 72, the under face of this disc 74 in this case serving as a supporting surface.

Since the system point guide rings 45 and 67 have the same internal dimensions, the magnifier holder 70 with the tracing magnifier 71 as well as the insert 47 for the drawing pencil or dotting pen may be alternatively inserted in the guide ring 45 or in the guide ring 67. In case of the position "pole at the end" (Fig. 1), in which the pole pin 25 is guided in the hollow joint pin 15, the writing pencil or dotting pen for reducing work is inserted in the guide ring 45 on the middle bar 39 and the tracing magnifier is inserted in the guide ring 67, while for the purpose of magnifying, the tracing magnifier is clamped in the guide ring 45 and the drawing pencil or dotting pen is clamped in the guide ring 67. In case of the position "pole in the middle" on the contrary the pole pin 25 is guided in the system point guide ring 45 of the middle slide 39 with the aid of the insert member 47, while the sleeve 50 for the pencil or dotting pen is inserted in the hollow joint pin 15, the threaded foot 59 of the wire release device being screwed on the thread 21 of the ring 22, if desired.

In order to be able to use the pantograph also in a convenient manner on an inclined drawing table, for which it is particularly suitable owing to its low arrangement, according to the invention a counterbalance of weight may be provided, consisting according to Figs. 9 and 10 of a counterbalance 75 fastened on one end of a cranked holding rod 76 (as shown in Fig. 1 in dotted lines). Rotatably mounted on an axle 78 on the under side of the counterbalance 75 is a roller 77. The free, downwardly cranked end of the holding bar 76 is provided with obliquely opposed pins 79 which can be put into notches 80 provided in the lateral edges of the cross bar 12, whereby the weight 75 is attached to the bar system. In case of the position "pole in the center" the counterbalance is dispensable even with inclined drawing plane.

The manipulation and operation of my novel pantograph corresponds to that of the known instruments and therefore does not require any further description.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A pantograph comprising a plurality of flat bars and joint means interconnecting said bars in the form of a parallelogram; a pole, a scriber, and a tracer making up the system points of the pantograph, and guides carried by the flat bars and having bores for bearing the said system points, said guides having supporting surfaces on the drawing plane serving to support the bar system, the distance of the supporting surfaces from the flat bars being so small that the bar system is supported just above the drawing plane.

2. A pantograph comprising a plurality of flat bars and joint means interconnecting said bars in the form of a parallelogram; a pole, a scriber, and a tracer making up the system points of the pantograph, and guides carried by the flat bars and having bores for bearing the said system points, said guides and said joint means having supporting surfaces on the drawing plane serving to support the bar system, the distance of the supporting surfaces from the flat bars being so small that the bar system is supported just above the drawing plane.

3. A pantograph comprising a plurality of flat bars and joint means interconnecting said bars in the form of a parallelogram; a pole, a scriber, and a tracer making up the system points of the pantograph, guides carried by the flat bars and having bores for bearing the said system points, said guides and said joint means having flat supporting parts disposed on the drawing plane beneath the flat bars for supporting the bar system, the distance of the under surfaces of the said supporting parts from the middle horizontal plane of the bar system being so small that the bar system is supported by the surfaces just above the drawing plane.

4. A pantograph according to claim 1, in which the guides carried by the flat bars comprise rings, the under surfaces of which form the supporting surfaces of the bar system, the rings bearing inserts having vertical bores of equal internal dimensions for alternatively guiding the scriber or the pole.

5. A pantograph according to claim 1, in which the guides carried by the flat bars comprise rings, the under surfaces of which form the supporting surfaces of the bar system, the rings having bores of equal internal dimensions for alternatively inserting the scriber or the tracer.

6. A pantograph comprising a plurality of flat bars and joint means interconnecting said bars in the form of a parallelogram; a pole, a scriber, and a tracer comprising a tracing magnifier having a center mark making up the system points of the pantograph, guides carried by the flat bars and having bores for bearing the said system points, said guides and said tracing magnifier having supporting under faces on the drawing plane serving for supporting the bar system and the distance of the supporting surfaces from the bar system being so small that the bar system is held a very small distance above the said drawing plane.

7. A pantograph according to claim 6, in which the guides for the system points comprise rings, the guiding ring for the tracing magnifier being secured to the free end of one of the flat bars of the bar system and having a rotatable tracing head.

8. A pantograph comprising a pair of parallel flat side bars in the form of rulers with graduations, a third flat bar jointedly connecting the ends of the side bars, a fourth flat bar also provided with graduations and jointedly connecting opposite points of said side bars in a parallelogram form, slides shiftably and adjustably mounted on the flat side bars and including joint pins; a pole member, a scriber member, and a tracer member comprising a tracing magnifier having a center mark, said members making up the system points of the pantograph, a pair of bearing sleeves for the said joint pins, a pair of arms projecting rectangularly from the ends of the fourth flat bar accommodating said bearing sleeves to be rotatable in the arms, and guides carried by the flat bars and bearing the system points, a ring held by the slide shiftably mounted on the said fourth flat bar in a position offset from the longitudinal axis of the bar so that the axis of said ring is in the connecting line of the joint pins mounted on the slides of the side bars, and said guides and joint means having supporting under faces on the drawing plane serving for supporting the bar system, the distance of the supporting faces from the middle horizontal plane of the bar system being so small that the bar system is supported a very small distance from the supporting plane.

9. A pantograph according to claim 1, in which the tracer comprises a tracing magnifier having a center mark, the under face of the tracing magnifier forming the supporting surface of the respective system point lying in the same plane as the supporting surfaces of the guides of the pole and the scriber.

10. A pantograph according to claim 1, in which wire releasing means are provided for said scriber.

References Cited in the file of this patent

UNITED STATES PATENTS

| Number | Name | Date |
|---|---|---|
| 310,186 | Diamond | Jan. 6, 1885 |
| 503,934 | Braastad | Aug. 22, 1893 |
| 834,470 | Hanssen | Oct. 30, 1906 |
| 1,508,280 | Kay | Sept. 9, 1924 |
| 1,707,914 | Lampe | Apr. 2, 1929 |
| 1,900,332 | Coradi et al. | Mar. 7, 1933 |
| 1,943,205 | Coradi | Jan. 9, 1934 |
| 2,132,452 | Zwick | Oct. 11, 1938 |

FOREIGN PATENTS

| Number | Country | Date |
|---|---|---|
| 11,128 | Great Britain | 1884 |
| 228,418 | Great Britain | Feb. 5, 1925 |
| 625,273 | Great Britain | June 24, 1949 |